United States Patent [19]

Fischer et al.

[11] Patent Number: 5,094,327
[45] Date of Patent: Mar. 10, 1992

[54] APPARATUS FOR COUPLING A WORKING-STATION SHAFT OF A PACKAGING MACHINE TO A MAIN DRIVE SHAFT THEREOF

[75] Inventors: Georg Fischer, Velbert; Wilhelm Pröpper, Langenfeld; Harald Jünkersfeld, Wuppertal, all of Fed. Rep. of Germany

[73] Assignee: Benz & Hilgers GmbH, Düsseldorf, Fed. Rep. of Germany

[21] Appl. No.: 620,403

[22] Filed: Nov. 29, 1990

[30] Foreign Application Priority Data

Dec. 2, 1989 [DE] Fed. Rep. of Germany ....... 3939991

[51] Int. Cl.⁵ ............... F16D 11/10; F16D 23/02; B60K 41/24
[52] U.S. Cl. .................... 192/18 R; 192/48.6; 192/67 R; 192/67 A
[58] Field of Search ............... 192/18 R, 18 A, 48.6, 192/67 R, 67 A, 85 C, 108

[56] References Cited

U.S. PATENT DOCUMENTS

| 2,957,563 | 10/1960 | Thumim | 192/18 A |
| 3,116,766 | 1/1964 | Lolse et al. | 192/67 R X |
| 3,550,738 | 12/1970 | Halibrand | 192/67 R X |
| 3,580,371 | 5/1971 | Kron et al. | 192/18 A |

FOREIGN PATENT DOCUMENTS 1161729 7/1964 Fed. Rep. of Germany .
1600211 4/1970 Fed. Rep. of Germany .

*Primary Examiner*—Richard Lorence
*Attorney, Agent, or Firm*—Herbert Dubno

[57] ABSTRACT

A lever connected to the working-station drive shaft of a packaging machine is accelerated by an energy source, for example, a piston-and-cylinder arrangement to rotate this shaft in the same sense as a continuously driven main drive shaft and enable a single-tooth jaw clutch to couple the two shafts without shock or impact.

8 Claims, 2 Drawing Sheets

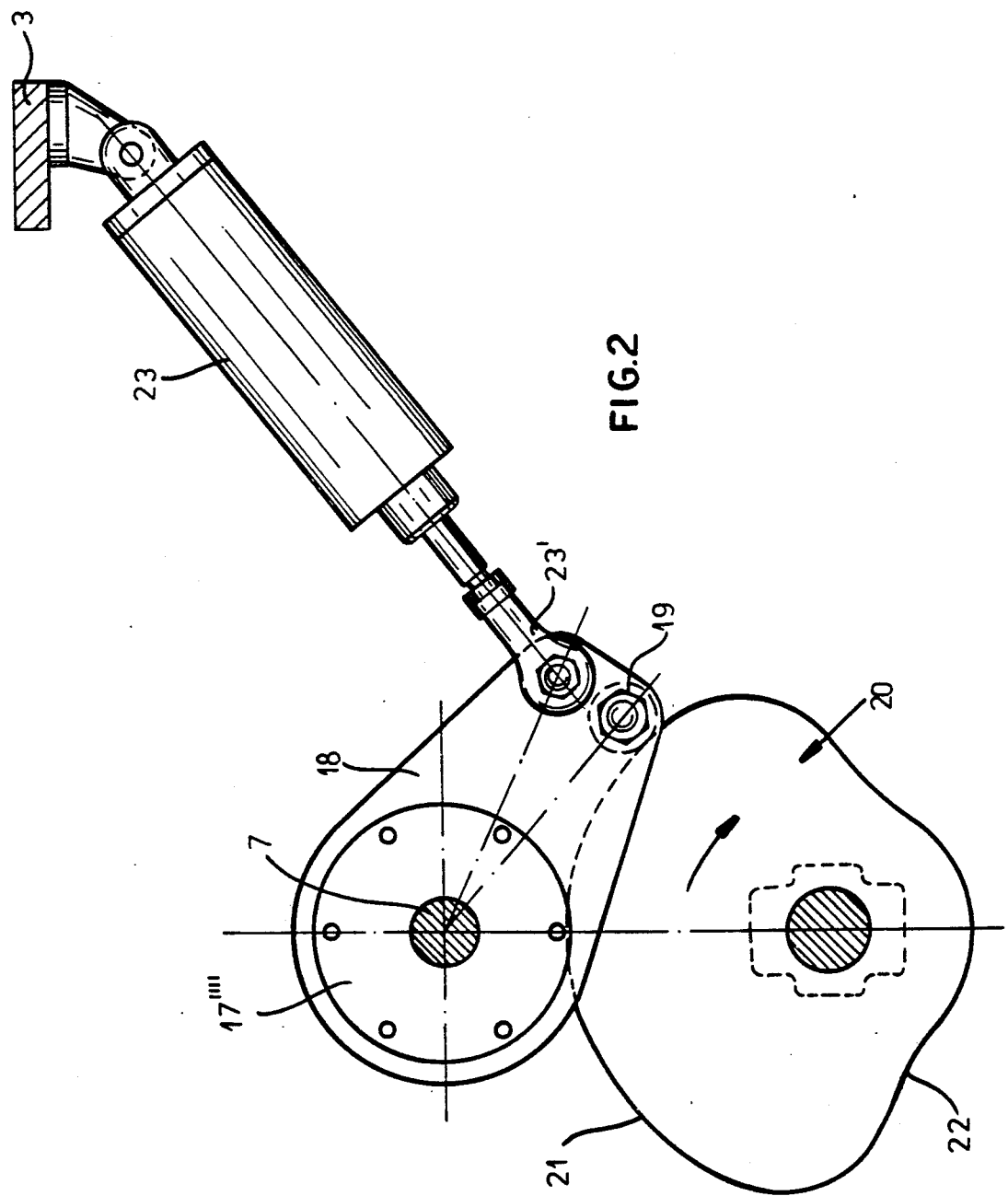

5,094,327

APPARATUS FOR COUPLING A WORKING-STATION SHAFT OF A PACKAGING MACHINE TO A MAIN DRIVE SHAFT THEREOF

FIELD OF THE INVENTION

Our present invention relates to a method for the coupling of a working-station drive shaft, i.e. a drive shaft of a working station of a machine, especially a packaging machine, to the main drive shaft thereof and for decoupling the working-station drive shaft therefrom utilizing a jaw clutch or like coupling device for positive connection of the two drive shafts and preferably a single-tooth jaw clutch. The invention also relates to a drive system including the means for coupling the two shafts.

BACKGROUND OF THE INVENTION

Customarily in packaging machines, for example machines for dispensing metered amounts of a comestible into a cup or for wrapping a metered amount of a substance, the main drive shaft is common to a multiplicity of working stations such as those delivering the cups, feeding the metered quantities of substance into the cups, closing the cups, etc., and each working station has a working-station drive shaft which is to be coupled to or decoupled from the main drive shaft. Such systems may use a single jaw clutch to effect the connection.

In most cases, it is necessary or desirable to reduce the speed of the main drive shaft and hence the cycling time to enable the engagement of a single jaw clutch without significant transmission of shock to the immobile working-station drive shaft or the generation of shock at the main drive shaft as a result of the coupling of the stationary working-machine drive shaft thereto.

A reduction in the speed of the main drive shaft is, however, a significant drawback since it materially reduces cycling time and the machine output. It is conceivable to avoid problems of such impact by overdimensioning the clutch and the clutch surfaces so that they are able to take up the shock of coupling directly. Not only is this an expensive approach, but it requires considerable space which may not always be available.

In German patent document DE-OS 1 600 211, a drive using a single-tooth clutch is described in which a friction clutch is also provided to enable the driven shaft to be brought up to speed of the drive shaft utilizing the slip in the friction clutch.

A similar approach is used in German patent document DE-PS 1 161 729.

The provision of friction clutches in packaging machines can present problems of wear and maintenance which best should be avoided. Furthermore, friction clutches may contribute inordinately to the cost of the apparatus.

OBJECTS OF THE INVENTION

It is, therefore, the principal object of this invention to provide a method of coupling a working-station shaft of a packaging machine with a main drive shaft thereof whereby the above-described drawbacks are avoided. Another object of this invention is to provide a method which allows the main drive shaft to continue in rotation without reduction in speed and thus ensures that the output of the machine will be maintained while nevertheless allowing shock-fre coupling of the working-station drive shaft with the continuously operating main drive shaft.

Still another object of this invention is to provide an improved low cost compact and simple device for coupling the shafts of a packaging machine.

SUMMARY OF THE INVENTION

These objects and others which will become apparent hereinafter are attained, in accordance with the invention, in a method in which the working-station drive shaft is accelerated to substantially the same speed as the main drive shaft and is rotated in the same sense prior to the engagement of the clutch, especially a single-jaw clutch so that the clutch engagement takes place largely in an impact-free manner. The preacceleration of the drive shaft is preferably effected simultaneously with the axial pressing of the first clutch part against the second clutch part of the clutch.

The method, therefore, may comprise the steps of:
(a) continuously driving the main drive shaft;
(b) from standstill, over at most one revolution of the main drive shaft, angularly displacing the working-station shaft in the same sense as that in which the main drive shaft is driven and to substantially the same speed; and
(c) clutching the main drive shaft to the working-station drive shaft to couple the shafts together upon angular displacement of the working-station shaft in the same sense as that in which the main drive shaft is driven and to substantially the same speed.

The method further comprises, in the preferred embodiment, the step of:
(d) axially pressing one part of a clutch adapted to couple the shafts against another part of the clutch during acceleration of the working-station drive shaft and until a tooth on one of the parts engages in a recess in another of the parts.

The drive for a packaging machine of the invention can comprise:
a continuously driven main drive shaft;
an intermittently rotatable working-station drive shaft parallel to the main drive shaft and operatively connected to a working station of the machine;
jaw-clutch means interposed between the shafts and actuatable to couple the main drive shaft with the working-station shaft to drive the working-station shaft from the main drive shaft; and
a mechanism connected to the working-station drive shaft for accelerating the working-station drive shaft from standstill, over at most one revolution of the main drive shaft, to substantially the same speed as that of the main drive shaft, whereupon the jaw-clutch means is effective to couple the main drive shaft with the working-station shaft to drive the working-station shaft from the main drive shaft.

Preferably the accelerating device or mechanism utilizes a controlled piston-and-cylinder arrangement which is pressurized by pressure medium. The piston-and-cylinder unit most advantageously is a compressed-air cylinder although a precisely controllable hydraulic cylinder may be used as well.

It has been found to be especially advantageous for the invention to pivotally connect the piston-and-cylinder arrangement at one end of the housing of the machine and at its opposite end to a lever which is swingable on the working-station drive shaft but is connected to the latter via an overrunning clutch, i.e. a clutch which allows engagement of the lever with the working-station drive shaft for rotation of the latter during acceleration in the same sense as the main drive shaft but allows free running of the clutch once the speed of that working-station drive shaft in that sense is greater than the angular velocity of the lever.

Advantageously, the lever in the region of its free end is provided with a pressing or cam-follower roller which cooperates with a cam angularly connected to the main drive shaft. Since the acceleration process always must reach a precise point in the angular displacement of the main shaft drive and the working-station drive shaft before the clutch engages, the cam can establish this point with precision. The cam can be a so-called open cam, i.e. a cam which allows the roller to be swung away from the cam surface.

To prevent undesirable rotation of the working-station drive shaft after the clutch has been disengaged, the working-station drive shaft is preferably formed with a brake, most advantageously a magnetic brake.

The actuation of the clutch, i.e. the displacement of a first clutch part against the second clutch part, can be effected by an actuating device which can include another piston-and-cylinder unit.

An especially compact arrangement is provided when the second clutch part rotates on the working-station drive shaft and is connected to a toothed wheel, e.g. a sprocket connected by an endless drive member, e.g. a chain, with another toothed wheel on the main drive shaft.

BRIEF DESCRIPTION OF THE DRAWING

The above and other objects, features and advantages of the present invention will become more readily apparent from the following description, reference being made to the accompanying drawing in which:

FIG. 2 is a section taken along the line II—II of FIG. 1.

SPECIFIC DESCRIPTION

Figure 1:
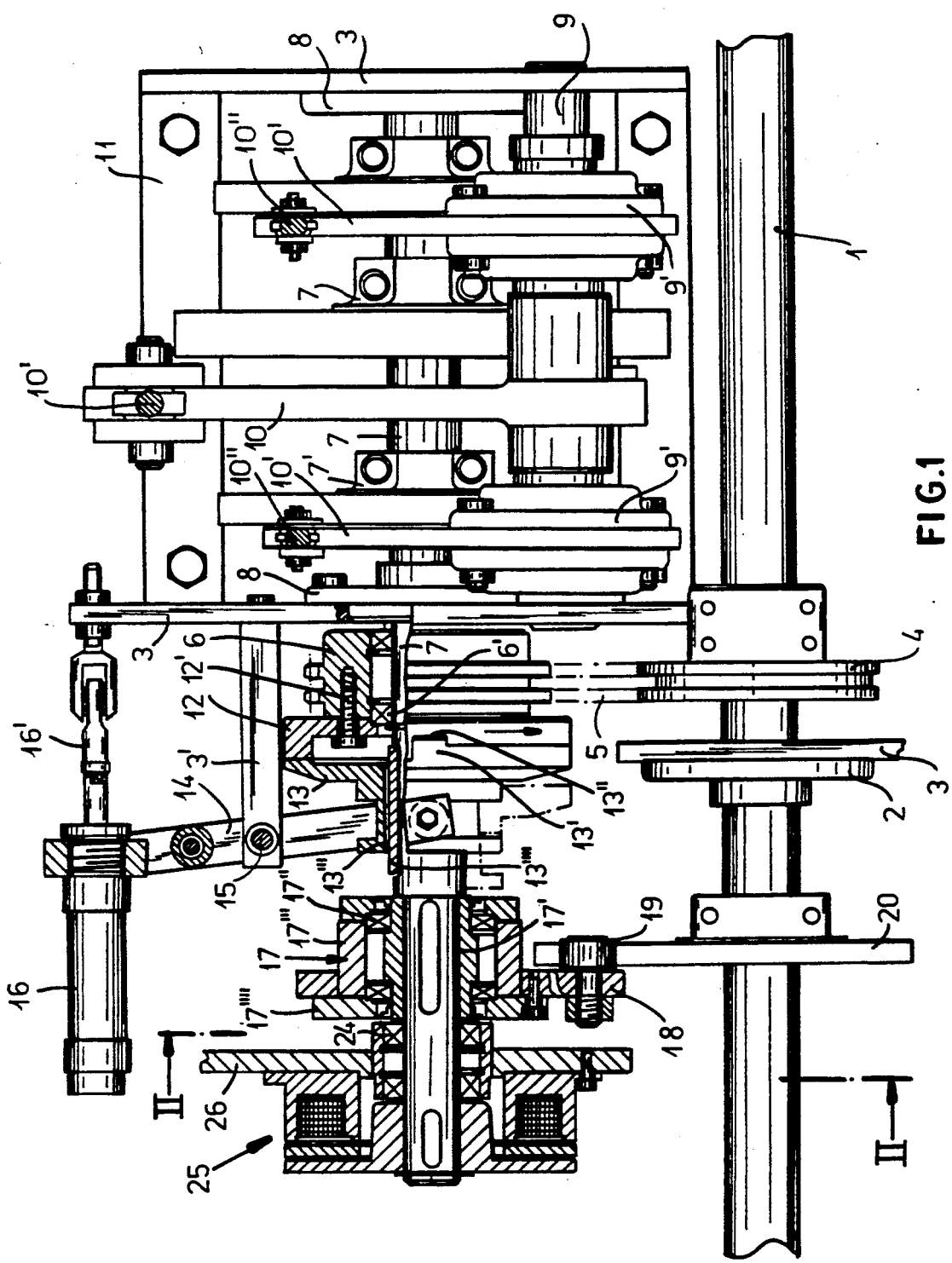
FIG. 1 is an axial cross-sectional view of a cup filling (i.e. a packaging) machine drive according to the invention.

As can be seen from FIG. 1, a main drive shaft 1 of a cup filling and closing packaging machine is journaled in a bearing 2 in a housing wall 3 of the machine.

The main drive shaft 1 is driven in turn by a motor (not shown) and can be considered to continuously rotate as long as the machine is in operation.

A driving tooth wheel or sprocket 4 is fixed to the main drive shaft 1 and is connected by a chain 5 forming an endless driving element as a toothed wheel 6 forming another sprocket and rotatable by bearings 6' on a working-station drive shaft 7 extending parallel to the main drive shaft 1.

The working-station drive shaft 7 may carry various members such as cams 7' for operating the various parts of the respective station of the packaging machine and is journaled in bearing 8 of the machine wall 3.

A lever shaft 9 is provided parallel to the working-station drive shaft 7 and is also journaled in the housing walls 3 and via levers and cam grooves and cam rollers is connected with the working-station drive shaft 7. For example, a lever 10 is connected to the lever shaft 9 and at its free end is articulated to a connecting rod 10" for operating the metered station of the packaging machine.

A further lever 10' laterally of the lever 10 and journaled at 9' carries the connecting rod 10" which is pivotally connected thereto for operating the turntable of the metering device as is conventional for cup-filling packaging machines. To stabilize the bearings of the two shafts 7 and 9, traverse 11 is provided. Bolts 12' connect a second driven clutch part 12 to the toothed wheel 6 and is driven in the direction of the arrow in FIG. 1, i.e. in the same sense and with the same speed as the shaft 1.

The clutch part 12 cooperates with a first clutch part 13 which is formed with a tooth 13' juxtaposed with the clutch part 12 and is engageable in a recess 13" of the second clutch part 12. The two clutch parts 12 and 13, therefore, form a so-called single-tooth jaw clutch.

For clutch engagement and disengagement, i.e. the axial displacement of the first clutch part 13 on the shaft 7 into engagement with the second clutch part 12. The clutch part 13 is provided with an axial groove 13''' in which a key 13'''' engages. Thus the clutch part 13 is keyed to the working-station drive shaft 7 but is axially shiftable thereon.

The mechanism for axially shifting the clutch part 13, i.e. for engaging and disengaging the single-tooth jaw clutch, includes an actuating lever 14 which is pivotally mounted at 15 on a stationary part 3' of the wall 3 of the machine.

For shifting the clutch part 13 via the actuating lever 14, we provide a piston-and-cylinder unit 16 which, at one end, is suspended via the piston rod 16' from the wall 3 of the machine while the body of its cylinder is pivotally connected to the lever 14. Upon contraction of the piston-and-cylinder unit, therefore, the clutch part 13 is drawn into its dot-dash line position shown in FIG. 1 to disengage the clutch. Upon elongation of the piston-and-cylinder unit 16, conversely the clutch part 13 is shifted to the right to press the tooth 13' against the clutch part 12.

An overrunning clutch 17 is provided on the working-station drive shaft 7 and includes an inner ring 17' keyed to the shaft 7. Roller bearings 17" journal the outer ring 17''' which allows free rotation of the shaft when the speed of the shaft is greater than that of the outer ring 1 which is coupled to the inner ring when the speed of the outer ring exceeds that of the shaft 7. The outer ring is connected by a washer 17'''' with a lever 18 formed at its free end with a pressing roller or cam-follower roller 19 (FIG. 2) bearing against a cam disk 20 keyed to the main drive shaft 1.

As will be apparent from FIG. 2, the accelerating mechanism includes a piston-and-cylinder unit 23, one end of which is pivotally connected to the machine housing 3 while the opposite end is pivotally connected to the lever 18. The cam 20 has a first cam track 21 and a second cam track 22 in the same plane as the first cam track.

A pivot head 23' connects the piston-and-cylinder unit 23 with the lever 18.

As is also apparent from FIG. 1, the drive shaft 7 is supported in another bearing 24 in a further housing wall 26 of the machine housing. In the region of the support bearing 24, the drive shaft 7 is provided with a magnetic brake 25.

The apparatus shown in FIGS. 1 and 2 operates as follows.

For the decoupling of the metering station of the packaging machine, the compressed-air cylinder is operated to shift the clutch part 13 in the dot-dash line position. Since the drive shaft 7 is only intended to be recoupled to the main drive shaft at a predetermined point in its 360° rotation per cycle, the pulse for decoupling must be applied at the precise point in the rotation of the shaft 7.

To prevent inertial running of the shaft 7, the brake 25 is engaged shortly before the clutch 12, 13 is decoupled. This is effected by applying a voltage to the magnetic brake in the sense tending to engage the latter. A permanent magnetic brake may also be used, in which case the electric current may be applied to neutralize permanent magnets and allow spring forces to engage the brake. Another rapid-brake engagement technique may be used as well.

For coupling the working-station drive shaft 7 with the main drive shaft 1, the piston-and-cylinder unit 23 is pressurized with compressed air to press the cam roller 19 against the cam track 21 of the cam 20. This occurs at the position indicated in FIG. 2. Simultaneously, the piston-and-cylinder unit 16 presses the clutch part 13 against the clutch part 12.

Since at this location the clutch tooth 13' has not yet jumped into its recess, the clutch remains ineffective. As the cam-follower roller 19 engages the cam track 22, the lever 18 is set into rotation in the same sense as that in which the main drive shaft 1 is driven and accelerates via the overrunning clutch 17 the shaft 7 in the same sense. The cam 20 is so designed and calculated that the angular displacement imparted to the shaft 7 will result in the clutch parts 12 and 13 having the same speed.

The lever 18 can then be swung by the piston-and-cylinder unit 23 again into its rest position. When the speeds of the clutch parts 12 and 13 are the same, the tooth 13' enters the recess in clutch part 12. The brake 25 is released shortly before the clutch engagement. Since the lever 18 is connected by an overrunning clutch 17 with shaft 7, the latter can be driven by the main drive shaft 1.

It will be apparent that other energy sources than compressed air may be used to accelerate the lever 18 and hence the shaft 7. For example, we may make use of a solenoid or like electromagnetic means as the energy source.

We claim:

1. A drive for a packaging machine, comprising:
 a continuously driven main drive shaft;
 an intermittently rotatable working-station drive shaft parallel to said main drive shaft and operatively connected to a working station of said machine;
 jaw-clutch means interposed between said shafts and actuatable to couple said main drive shaft with said working-station shaft to drive said working-station shaft from said main drive shaft;
 a mechanism connected to said working-station drive shaft for accelerating said working-station drive shaft from standstill, over at most one revolution of said main drive shaft, to substantially the same speed as that of said main drive shaft, whereupon said jaw-clutch means is effective to couple said main drive shaft with said working-station shaft to drive said working-station shaft from said main drive shaft; and
 said mechanism including a lever coupled to said working-station drive shaft and a piston-and-cylinder arrangement operatively connected with said lever and operated by a fluid pressure medium to accelerate said working-station drive shaft.

2. The drive defined in claim 1 wherein said piston-and-cylinder arrangement is pivotally connected at one end to a housing for said machine and at an opposite end to said lever, said lever being coupled with said working-station drive shaft by an overrunning clutch.

3. The drive defined in claim 2 wherein said lever is formed with a free end and in a region of said free end with a cam-follower roller, said mechanism further comprising a cam carried by said main drive shaft, said roller riding on said cam.

4. The drive defined in claim 3 wherein said cam is an open, cam, said roller being free to move away from said cam.

5. The drive defined in claim 4, further comprising a brake for said working-station drive shaft.

6. The drive defined in claim 5 wherein said brake is a magnetic brake.

7. The drive defined in claim 1 wherein said clutch has a first clutch part axially shiftable along said working-station drive shaft and connected thereto by a key-and-groove device, a second clutch part drivingly connected to said main drive shaft for rotation in the same sense as said main drive shaft and at the same speed, said second clutch part being rotatable on said working-station drive shaft, and a piston-and-cylinder arrangement connected to said first clutch part for axially displacing same toward and away from said second clutch part.

8. The drive defined in claim 7 wherein said second clutch part is fixed to a toothed wheel connected by endless transmission means to a toothed wheel on said main drive shaft.

* * * * *